Jan. 7, 1930.

M. MORGAN 1,743,044

CONVEYING MECHANISM

Filed Dec. 24, 1928    2 Sheets-Sheet 1

Inventor
Myles Morgan

By Geo. H. Kennedy Jr.
Attorney

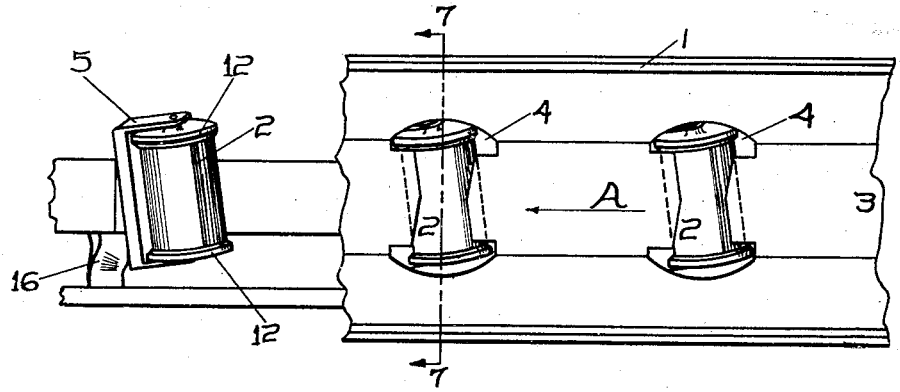
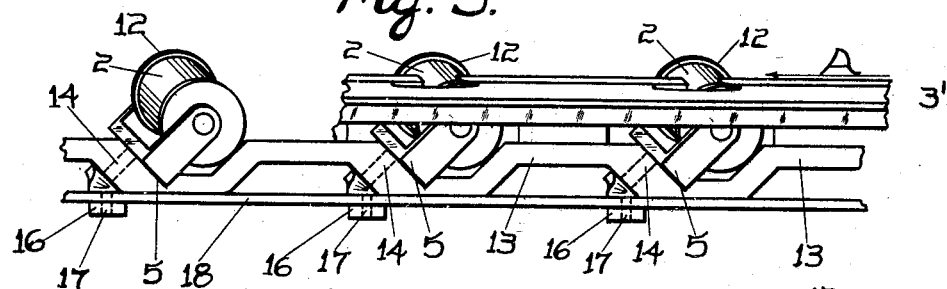
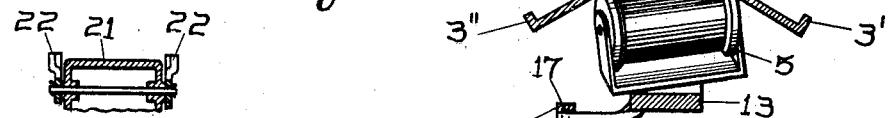
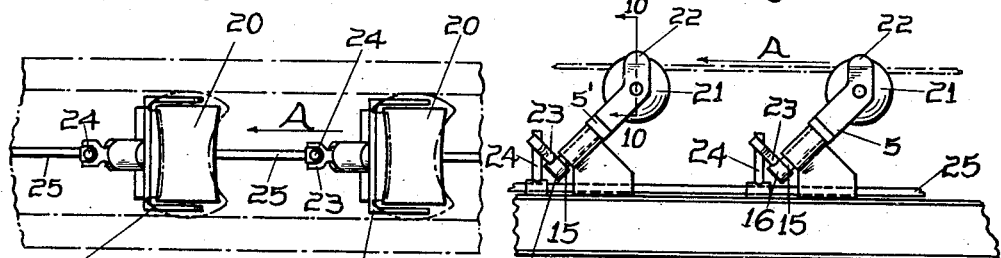
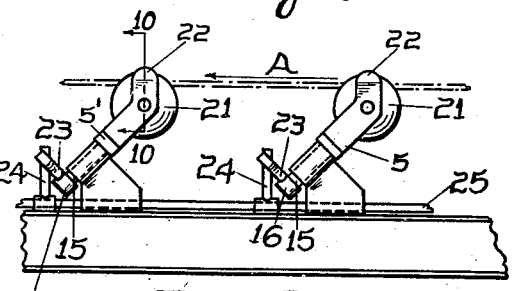

Patented Jan. 7, 1930

1,743,044

UNITED STATES PATENT OFFICE

MYLES MORGAN, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS

CONVEYING MECHANISM

Application filed December 24, 1928. Serial No. 328,149.

The present invention relates to conveying mechanism of the type that provides a series of alined rotatable rollers for the support and longitudinal movement of articles or materials to be conveyed; the latter being ordinarily in more or less elongated forms, such for example, as lumber or the various rolled products of a steel mill.

According to the invention, and in consequence of its radically new arrangement and mounting of the several rollers, certain new and highly useful results in the handling and disposition of the conveyed materials are obtained, among others, the ability of the conveyor, notwithstanding the presence of obstructions, (such as end-flanges on the rollers) that normally prevent the conveyed material from running off sidewise, to procure, when desired, the unobstructed broadside delivery of said material from the rollers in either direction, for discharge or removal from the conveyor at any selected point. Other objects and advantages of the invention will be apparent from the following detailed description thereof, reference being had in this connection to the accompanying drawings, wherein—

Fig. 5 is a view similar to Fig. 1, showing the rollers in a different position.

Fig. 6 is a side view, like Fig. 2, showing the rollers in the position illustrated by Fig. 5.

Fig. 7 is a sectional view, the section being taken on the line 7—7 of Fig. 5.

Fig. 8 is a diagrammatic plan view illustrating certain modifications of the invention.

Fig. 9 is a diagrammatic view in side elevation, partly in section, illustrating other modifications of the invention.

Fig. 10 is a section on the line 10—10 of Fig. 9.

Like reference characters refer to like parts in the different figures.

Figure 1:
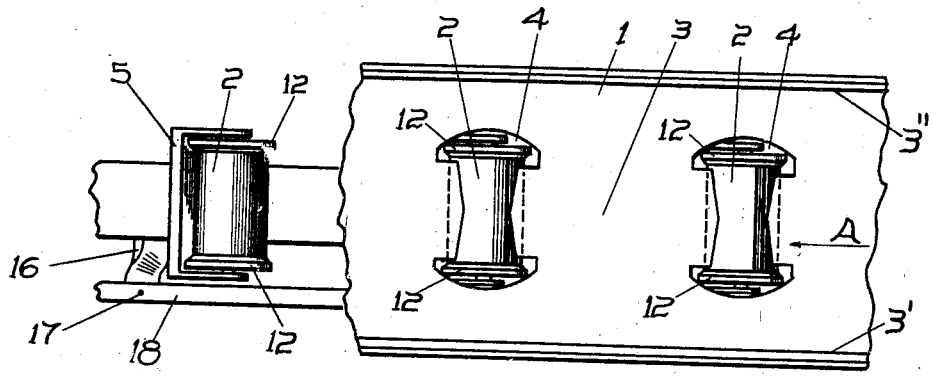
Fig. 1 is a top plan view of conveying mechanism embodying my invention, with parts broken away to reveal one of the rollers.

In said drawings, the invention is illustrated in connection with a plurality of alined conveyor rollers 2, 2 which are shown arranged, in the usual manner, with their material-supporting surfaces in a common plane slightly above a floor 3 provided by the conveyor base or frame 1. Said floor 3 has openings 4, 4 through which the rolls 2, 2 project, and said openings at their ends are suitably shaped to permit the flanges, or other elements that normally confine the conveyed material on said rollers, to move freely and without interference, when the rollers are moved, as hereinafter described. In the form of conveyor herein selected to illustrate the invention, the surface of the floor 3 slopes off on either side of the series of rollers 2, 2, to form opposite longitudinally extending troughs or pockets 3′ and 3″, for the reception of such of the conveyed material as may be selected for sidewise delivery from said rollers 2, 2, in the manner hereinafter described.

Figure 4:
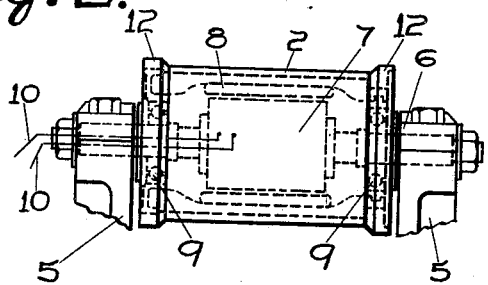
Fig. 4 shows a roller in side elevation, as viewed from the line 4—4 of Fig. 2.

According to the invention, each roller 2 is mounted, for rotation about its own axis, in a yoke-like supporting member 5 which itself, as hereinafter described, is capable of a certain swinging or turning movement, relative to the stationary base or frame 1 of the conveyor. The axial rotation of each roller 2 may be secured in any suitable way; the driving devices employed to impart such rotation, form, of themselves, no part of this invention. For illustrative purposes, the several rollers 2, 2, are here shown (Fig. 4) with self-contained electric motor drives, of the known type wherein the usual relative positions of stator and rotor elements are interchanged. That is to say, the stator 6, supported by yoke 5 and carrying the primary windings 7 of the motor, is an axially disposed element completely surrounded by the rotor 8, the latter being carried interiorly by the roller 2 itself, whose ends provide bearings 9, 9 for the rotative support of said roller on the stator element 6. When electric current is supplied to the primary windings 7 through the medium of the supply leads 10 that are carried in through one end of the stator 6, the motor becomes operative and thereby causes rotation of said roller 2.

Figure 2:
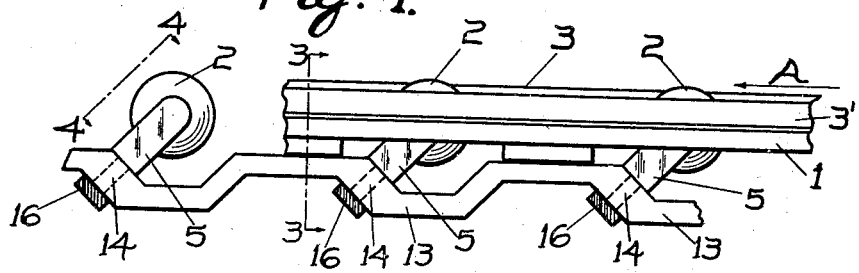
Fig. 2 is a side view of the mechanism shown in Fig. 1.
Figure 3:
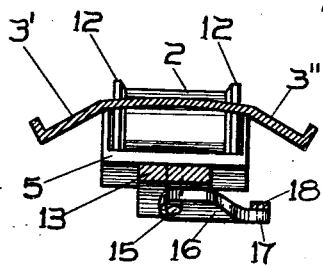
Fig. 3 is a cross sectional view, the section being taken on the line 3—3 of Fig. 2.

Each roller 2, in the form of the invention shown in Figs. 1 to 4 inclusive, provides opposite end-flanges 12, 12, which, in the normal position and operation of the series of rollers 2, 2, prevent the conveyed material from running sidewise off the cylindrical supporting surfaces of said rollers. The yoke-like supporting member 5 of each roller unit is so mounted in the conveyor base or frame as to project the roller 2 through its opening 4, slightly above the floor 3 of the conveyor when said roller is in normal position, as shown in Figs. 1 and 2. In the copending application for United States Letters Patent of E. J. Quinn, Serial No. 129,486, filed August 16, 1926, similar roller-supporting members are mounted on perpendicular pivots, which directly underlie the axis of the associated roller, whereby, through oscillation of said supporting members, the rollers may be skewed in one direction or the other from their normal positions to porcure broadside discharge of the conveyed material at one side or the other of the conveyor. This broadside discharge however, with the roller mountings provided as in the aforesaid Quinn application, is only possible of attainment with rollers of uniform diameter from end to end; it cannot be obtained when rollers having end flanges, as here shown, to normally restrain the stock from running off sidewise, are used, because said end flanges, regardless of the skewed disposition of the rollers, would still stand in the way of any sidewise discharge of the material from the supporting surface of the rollers.

According to the present invention, this obstacle to the use of flanged rollers in a conveyor of the described type is overcome by mounting each yoke-like supporting member 5 for movement about a pivotal axis that stands forwardly of the roller, at an inclination both to the horizontal and to the vertical plane of said roller's axis. As shown in the drawings, the conveyor frame or base 1, below and forwardly of each roller 2, provides portions 13, 13, in each of which is formed a bearing aperture 14 of the axial inclination above described, to receive a spindle or pin 15, projecting forwardly and downwardly from the center of the yoke-like roller supporting member 5. Each pin 15 has projecting therefrom an arm 16, and the several arms 16, 16 may be engaged and operated in unison in any well known manner, as by pivot pins 17, 17, connecting them to a common operating bar 18 that is movable in one direction or the other to oscillate the pins 15 back and forth in their bearings.

In the normal position of the parts, each roller 2 is so held that its axis stands at right angles to the direction of forward travel of the material on the conveyor, as indicated by the arrow A in Fig. 2. The above described pivotal mounting of each roller unit is such that when a supporting member 5 is rocked in its inclined bearing 14, the roller axis not only assumes a skewed relation to its normal position (as is the case with the perpendicularly pivoted rollers of the aforesaid Quinn application), but it also has one end depressed and the other end correspondingly elevated. This results from the inclined disposition of the axis on which each yoke 5 is mounted for turning movement; as shown in Figs. 5, 6 and 7, such turning movement depresses one end of the roller axis and raises the other end, and simultaneously said roller axis shifts angularly, so that the depressed end is displaced rearwardly of the conveyor.

In other words, the inclined pivotal mountings of the yokes 5, 5 permit the roller axes to be skewed in unison, in one direction or the other, whereby to secure in the well-known manner, a combined sidewise and forward movement of the conveyed material on the rollers, and the arrangement is such that those ends of the rollers 2, 2 toward which the material moves sidewise are, in either case, the ends which are depressed, when the skewed relation is established. As such depression disposes an end flange 12 of each roller below the floor level 3, it follows that the conveyed material, moving sidewise toward said depressed ends, will clear said end-flanges, (Fig. 7) as it rides off the rollers into the adjacent trough 3' or 3" as the case may be.

A modfication of the invention shown in Fig. 8 provides rollers 20, 20 carried by pivotally mounted yokes 5, 5, so arranged as to secure the same capabilities of conveyor operation as described above. These rollers 20, 20, instead of providing end-flanges, have dished or concave peripheral surfaces, and the conveyed material which ordinarily with such rollers in normal position would have a tendency to climb sidewise, is centrally maintained thereon by the expedient of running alternate rollers respectively faster and slower than the delivery speed of said material; in this way, running friction is substituted for static friction, eliminating the tendency to climb to the largest diameter, and causing the material to remain, by gravity, at the smallest diameter.

Another modification of the invention, shown in Figs. 9 and 10 provides rollers 21, 21 of uniform diameter from end to end;—in this case the conveyed material, with the rollers in normal position, is prevented from running off sidewise by extensions 22, 22 of the two sides of each pivoted supporting yoke 5', which project above the cylindrical surface of the roller. In the same way as the skewing of a roller 2 depresses one of its end flanges 12 below the floor 3, so the skewing of a roller 20 or 21, similarly depresses, in the case of roller 20, its large-diameter end, and in the case of roller 21, the adjacent guard or extension 22, so that the sidewise-moving material is free to be delivered over the ends of a series of such rollers, at any point in the length of the conveyor. Figs. 8 and 9 illustrate a modification also of the devices employed to shift the yokes 5 and 5' on their inclined pivotal axes. In this case, the arms 16' of the pivot shafts 15 are forked, as shown at 23, 23 to embrace upright pins or arms 24, 24 carried by a rock-shaft 25. The latter, when swung in its bearings, not shown, will cause the yokes to pivot, in one direction or the other.

In all forms of the invention, the axis of each roller, in the act of securing broadside discharge of the conveyed material, is not only skewed or angularly displaced from its normal position, but is also tipped downwardly at that end of the roller toward which the skewing causes the material to approach, by a combined longitudinal and sidewise movement. This downward tipping serves to render temporarily ineffective the agencies which normally prevent the material from running off sidewise.

I claim:

1. Conveying mechanism comprising a series of alined rotatable rollers, each supported by a member which is pivotally mounted on an axis inclined downwardly and forwardly from the roller axis.

2. Conveying mechanism comprising a plurality of rollers, means for skewing said rollers in unison, to procure sidewise movement of the conveyed material thereon, and a mounting for each roller which permits said skewing and simultaneously causes the depression of that end of the roller toward which the material moves sidewise.

3. Conveying mechanism comprising a plurality of alined rotatable rollers having end flanges normally serving to prevent the conveyed material from running off sidewise, means for skewing said rollers in unison, to procure sidewise movement of the conveyed material thereon, and a mounting for each roller that permits said skewing and simultaneously causes depression of one end-flange below the normal plane of support of the material, whereby said material, in its sidewise movement clears said end-flange.

4. In conveying mechanism of the class described, a series of rotatable rollers, and a series of supports therefor, each of which is pivoted on a forwardly and downwardly inclined axis at right angles to the axis of the associated roller.

5. In conveying mechanism of the class described, a rotatable roller, and means for simultaneously imparting a skew to the axis of said roller and tipping said axis downwardly at that end toward which the conveyed material moves sidewise in consequence of said skewing.

6. In conveying mechanism of the class described, a roller rotatable normally on an axis in a horizontal plane, and means for skewing said roller and simultaneously shifting said axis out of said plane, to depress that end of the roller toward which the conveyed material moves sidewise, in consequence of said skewing.

7. In conveying mechanism of the class described, a plurality of alined rotatable rollers for the support and movement of material, said rollers being flanked on either side by stationary supporting surfaces in substantially the same plane as the supporting surfaces of said rollers, the latter having end flanges acting normally to prevent the conveyed material from running off sidewise, means for skewing said rollers, to produce sidewise movement of the conveyed material on said rollers, and means for simultaneously tilting each roller from the horizontal plane, causing the depression of one end flange below the adjacent stationary supporting surface, thereby to permit broadside discharge of the conveyed material from the rollers onto said stationary surface.

8. A roller conveyor providing a stationary floor portion and a series of alined rotatary rollers, the latter having elements incorporated therewith that normally act to obstruct the sidewise movement of the conveyed material off said rollers, and means responsive to the skewing of said rollers for disposing certain of said elements below the floor portion, whereby the conveyed material's sidewise movement resulting from said skewing procures broadside discharge of same from said rollers onto said floor portion.

9. A conveyor of the class described, providing a series of alined rotatable rollers flanked on one side by a stationary supporting surface, means acting normally to obstruct sidewise movement of the conveyed material from said rollers to said supporting surface, and means responsive to the skewing of said rollers for rendering said obstructing means ineffective, whereby the material's sidewise movement resulting from said skewing procures its broadside discharge from said rollers onto said supporting surface.

10. In a conveyor of the class described, a series of rollers rotatable normally with their axes horizontal and at right angles to the center line of said conveyor, and means for simultaneously shifting said roller axes from their normal positions, to skew them with relation to said center line and to depress the ends toward which the conveyed material moves sidewise, in consequence of said skewed relation.

11. In conveying mechanism of the class described, a stationary floor portion and a series of alined rotatable rollers, the latter having elements incorporated therewith that normally act to obstruct the sidewise movement of the conveyed material from said rollers onto said floor portion, means for skewing said rollers, to produce sidewise movement of the conveyed material thereon, and a mounting for each roller that permits said skewing and simultaneously causes the depression of certain of said obstructing elements below said floor portion, whereby said sidewise movement is effective to carry the material onto said floor portion from the ends of said rollers.

12. In a roller conveyor, a series of alined rotatable peripherally-dished rollers of larger diameter at their ends than at their central portions, means for rotating alternate rollers of said series at respectively higher and lower speeds than the delivery speed of the conveyed material, thereby normally to maintain said material at the central small diameter portions of said rollers, and means for skewing said rollers in unison, and simultaneously depressing the same at corresponding ends, whereby the sidewise movement produced by said skewing is effective to discharge said material over said depressed ends.

Dated this 19th day of December, 1928.

MYLES MORGAN.